Figure 3:
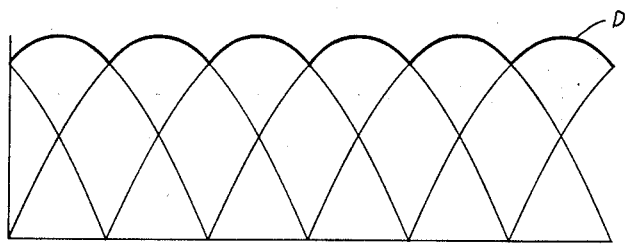

Feb. 11, 1941.   F. O. STEBBINS   2,231,604
ELECTRIC VALVE CONVERTING APPARATUS
Filed Oct. 26, 1939   2 Sheets-Sheet 1
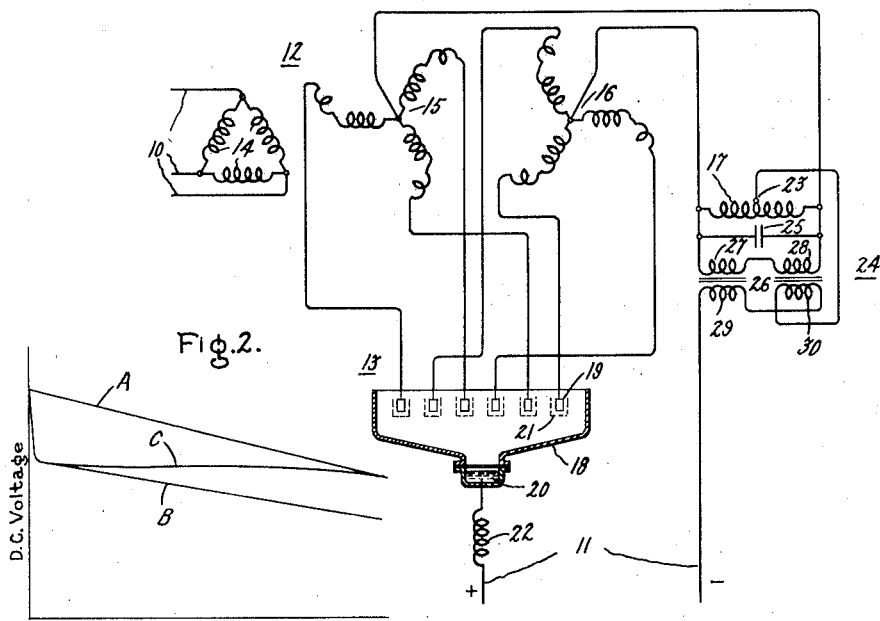
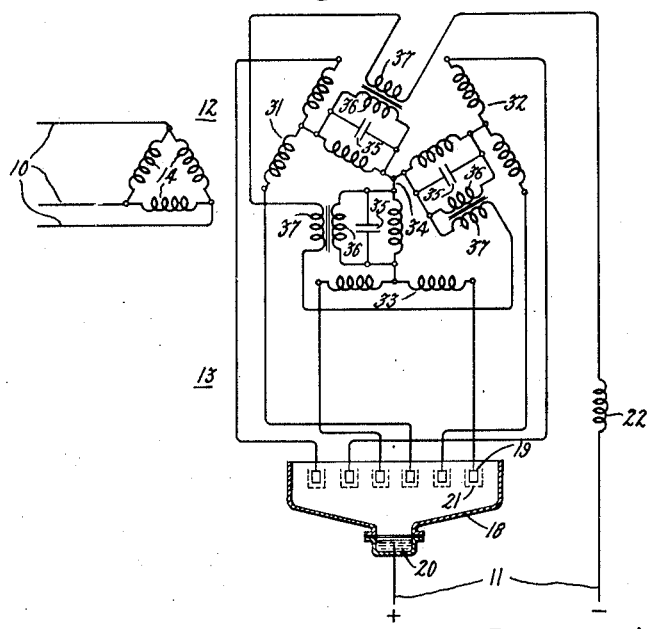
Inventor:
Frederick O. Stebbins,
by Harry E. Dunham
His Attorney.

Feb. 11, 1941.  F. O. STEBBINS  2,231,604
ELECTRIC VALVE CONVERTING APPARATUS
Filed Oct. 26, 1939    2 Sheets-Sheet 2

Inventor:
Frederick O. Stebbins,
by Harry E. Dunham
His Attorney.

Patented Feb. 11, 1941

2,231,604

UNITED STATES PATENT OFFICE 2,231,604

ELECTRIC VALVE CONVERTING APPARATUS

Frederick O. Stebbins, Schenectady, N. Y., assignor to General Electric Company, a corporation of New York Application October 26, 1939, Serial No. 301,418

5 Claims. (Cl. 175—363)

My invention relates to an electric valve converting apparatus for transmitting energy between an alternating current circuit and a direct circuit and more particularly to an improved apparatus and method of operation whereby an improved regulation of the direct current voltage is realized.

It is known that a variation of the direct current voltage of an electric valve converting apparatus may be obtained by controlling the effectiveness of the interphase transformer associated therewith. The theory upon which this type of direct current voltage control is based is well known in the art. When a six-phase rectifier is operating with a simple diametrical connection of the transformer secondary windings, the mean value of the direct current voltage is represented by the equation $$V_{DC} = \frac{E(1 + \sin 60°)}{2} = 0.93\ E$$

where E is the maximum value of the alternating current voltage. If, however, the six anodes of the rectifier are connected to a double three-phase system having an interphase transformer between the neutral points of the transformer secondary windings, the mean value of the direct current voltage is represented by the equation $$V_{DC} = \frac{E(1 + \sin 30°)}{2} = 0.75\ E$$

Since this latter voltage is approximately twenty per cent less than the former, it is evident that direct current voltage regulation may be obtained by causing the interphase transformer to be more or less effective. Attempts have been made to solve the problem of maintaining the direct current output voltage of the electric valve converting apparatus substantially constant between no load and full load so that such electric valve converting apparatus may be operated in parallel with regulated dynamo-electric machines. Such attempts have involved the saturation of the core of the interphase transformer in accordance with the direct current load thereby making the interphase transformer more or less effective to obtain the desired voltage regulation. This method has not been altogether satisfactory because of the difficulty encountered in maintaining the voltage constant over the load range and because of the low resulting power factor. Other attempts have involved arrangements where means are provided for short-circuiting the interphase transformer or inserting impedance in parallel with the interphase transformer and gradually varying the amount of this impedance inserted in accordance with the varying load. However, these arrangements are not automatic in their operation and most of them require an inordinate amount of auxiliary apparatus, thus greatly increasing the initial cost as well as the cost of operation. It has also been suggested to connect a serially arranged capacitor and reactor in shunt with the interphase transformer for varying the effectiveness thereof, but these arrangements have been impractical when used with electric valve converting apparatus of large kva. rating due to the large amount of condenser kva. necessary to carry the current when the interphase transformer is ineffective and the cost makes its use prohibitive. In accordance with my invention the difficulties mentioned above are overcome by the provision of an electric valve converting apparatus in which direct current voltage regulation is obtained by the provision of an interphase system having connected in shunt therewith a wave trap filter comprising a parallel resonant circuit arranged to vary the effective impedance of the interphase transformer in inverse proportion to the direct current load. In this arrangement the necessary condenser kva. is very small and in fact the capacitor is really used only for tuning purposes at low load values.

It is an object of my invention, therefore, to provide an improved electric valve converting apparatus adapted to transmit energy between direct and alternating current circuits which obviates the above mentioned undesirable features of the prior art arrangements and which is simple and reliable in operation.

It is another object of my invention to provide a new and improved electric valve converting apparatus.

It is a further object of my invention to provide an improved electric valve converting system and method of operation therefor for transmitting energy between direct and alternating current circuits wherein the direct current voltage is maintained substantially constant between no load and full load.

In accordance with the illustrated embodiment of my invention I provide an electric valve converting apparatus of the type including an interphase transformer. This interphase transformer is made fully effective as the load increases so as to maintain a substantially constant voltage between no load and full load on the direct current circuit. A wave trap filter comprising a parallel resonant circuit is connected in shunt with the interphase transformer at no load and this filter gradually becomes dissonant as the load increases, thereby furnishing a lower and lower impedance to current which would normally tend to flow through the interphase transformer. This parallel resonant circuit is applicable to all electric valve converting apparatus employing an interphase system.

Figure 4:
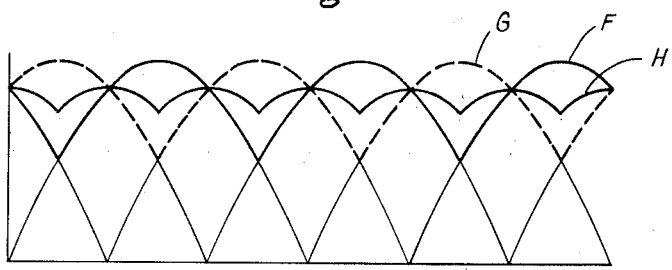
Figure 6:
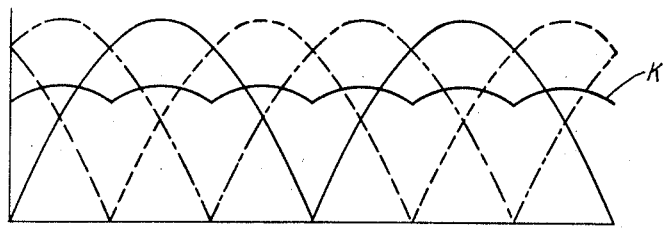

The novel features which I believe to be characteristic of my invention are set forth with particularity in the appended claims. My invention itself, however, will best be understood by reference to the following description taken in connection with the accompanying drawings in which Fig. 1 diagrammatically represents one embodiment of my invention; Figs. 2, 3, and 4 represent certain operating characteristics of the apparatus illustrated in Fig. 1 in order to aid in the understanding of the invention; Fig. 5 illustrates another embodiment of the invention, and Fig. 6 represents an operating characteristic of Fig. 5.

In the arrangement of Fig. 1, power is transmitted between three-phase alternating current circuit 10 and direct current circuit 11 through a main transformer 12 and an electric valve converting apparatus 13. The transformer 12 is illustrated as having primary windings 14 connected to alternating current circuit 10 and two groups of secondary windings 15 and 16. The secondary windings 15 and 16 are illustrated as zigzag wye connected windings, the neutral terminals of which are interconnected by means of interphase transformer 17. The electric valve converting apparatus comprises an electric valve device 18 having a plurality of anodes 19 and a single cathode 20. If desired, electric valve device 18 may be provided with control electrodes or grids 21. The anodes 19 are interconnected with the respective terminals of the various phases of wye-connected secondary transformer windings 15 and 16. The cathode 20 of electric valve device 18 is connected through a smoothing reactor 22 to the positive terminal of the direct current circuit 11 when the electric valve converting apparatus operates as a rectifier. The negative terminal of direct current circuit 11 is connected to the midpoint 23 of interphase transformer 17.

While I have illustrated electric valve device 18 as of the multi-anode single cathode type, it will be understood by those skilled in the art that electric discharge valves having a single anode and cathode mounted within an envelope may equally well be used. Furthermore, any of the electric valves known to the art may be used although I prefer to use electric valves of the type wherein the electrodes are mounted within an envelope containing an ionizable medium.

In order to obtain the desired voltage regulation, there is connected across interphase transformer 17 a wave trap filter 24 comprising a parallel resonant circuit including capacitor 25 and reactor 26. Reactor 26 is provided with two serially connected reactance windings 27, 28 and respective saturating windings 29, 30. The saturating windings 29 and 30 are connected in the direct current circuit 11 with winding 30 reversely connected with respect to winding 29 so that the same reactance exists in reactor 26 during both half cycles of the potential across interphase transformer 17. Capacitor 25 and reactor 26 connected in parallel are so designed as to be in resonance when no current flows in direct current circuit 11. Thus wave trap filter or parallel resonant circuit 24 affords substantially an infinite impedance to any current at no load on the rectifier and the interphase transformer 17 is fully effective. Capacitor 25 may therefore be designed to carry very little current since it functions merely as a tuning capacitor whereby resonance may be obtained. When interphase transformer 17 is short-circuited, reactor 26 carries the current and not capacitor 25.

The operation of the apparatus illustrated in Fig. 1 will be understood by those skilled in the art. Alternating current is supplied from alternating current circuit 10 to the electric valve converting apparatus 13 through transformer 12 and rectified current is supplied to direct current circuit 11 in a well known manner. Referring to Fig. 2, it may be seen that the voltage applied to the direct current circuit 11 in the absence of the interphase transformer when the neutral terminals of windings 15 and 16 are directly connected so that a true six-phase winding exists is indicated by the curve A wherein the load current is plotted against the direct current voltage. When the interphase transformer is connected between the neutrals of secondary windings 15 and 16 without the parallel resonant circuit 24, the regulation curve is indicated by B of Fig. 2. The curve C of Fig. 2 indicates one form which the resultant regulation curve may take when the wave trap filter or parallel resonant circuit 24 of Fig. 1 is used.

When full load current is flowing through direct current circuit 11 reactor 26 is completely saturated by virtue of the saturating windings 29 and 30 and the impedance thereof is substantially zero so that the interphase transformer is short-circuited. Nevertheless, capacitor 25 carries little or no current at this time and hence the condenser kva. required is very small. When the interphase transformer 17 is short-circuited, the electric valve converting apparatus operates so as to produce a six-phase ripple in the direct current circuit 11 as indicated in Fig. 3, where the curve D represents direct current voltage when no reactance is present in the direct current circuit to act as a smoothing means. If now the interphase transformer is made fully effective, that is, if the parallel resonant circuit 24 affords a very high impedance to any current which would otherwise flow through the interphase transformer, the electric valve converting apparatus operates as in Fig. 4, where the curve F represents the direct current voltage produced by one wye-connected secondary winding and its associated discharge paths while the curve G represents the direct current voltage produced by the other wye-connected secondary winding and its associated discharge paths. The curve H represents the resultant six-phase ripple voltage obtained when the interphase transformer operates and is substantially lower in value than the voltage indicated by the curve D of Fig. 3 above. The curves D and H of Figs. 3 and 4 therefore respectively represent the two extremes between which the voltage may be varied to give the desired voltage regulation. When the reactor 26 is in the unsaturated condition, that is, when no current flows through saturating windings 29 and 30 thereof, the wave trap filter 24 is so designed as to be in resonance and hence effectively acts as an open circuit as far as the shunt path of the interphase transformer is concerned. As the load increases on the electric valve converting apparatus, reactor 26 begins to saturate and the resonant circuit becomes more and more dissonant so that more and more current is by-passed around interphase transformer 17 as the impedance of the shunt circuit decreases with increasing load.

An even greater range of voltage variation exists in the case of the triple single-phase electric valve converting apparatus transformer as illustrated in Fig. 5. The corresponding parts of Fig. 5 are designated by the same reference numerals as in Fig. 1. Energy is transmitted between alternating current circuit 10 and direct current circuit 11 through electric valve converting apparatus 13 comprising a transformer 12 having a primary winding 14 associated with the alternating current circuit 10 and secondary windings 31, 32, and 33 the neutral points of which are interconnected by means of a three-phase interphase transformer 34. Each of the three phases of interphase transformer 34 is shunted by a wave trap filter or parallel resonant circuit comprising capacitor 35 and reactor 36. Each reactor 36 is provided with a saturating winding 37 connected in series with the direct current circuit leading from the neutral point of the interphase transformer. When the reactors 36 are completely saturated the interphase transformers are short-circuited and the electric valve converting apparatus 13 acts as a six-phase rectifier with diametric transformer connections and the output voltage is represented by the curve D of Fig. 3. When the interphase transformer 34 is made fully effective, however, as when the wave trap filter is in resonance, the direct current output voltage of the electric valve converting apparatus is represented by the curve K of Fig. 6 which is considerably lower in value than the voltage represented by curve D of Fig. 3 as will be well understood by those skilled in the art.

The operation of the apparatus illustrated in Fig. 5 will be well understood by those skilled in the art in view of the description included above in connection with the operation of Fig. 1.

While I have shown and described my invention as applied to a particular system of connections and as embodying various devices diagrammatically shown, it will be obvious to those skilled in the art that changes and modifications may be made without departing from my invention, and I therefore aim in the appended claims to cover all such changes and modifications as fall within the spirit and scope of my invention.

What I claim as new and desire to secure by Letters Patent of the United States, is:

1. In an electric valve converting apparatus, a supply circuit, a load circuit, an electric translating apparatus interconnecting said circuits and comprising a plurality of electric valve means and an interphase system, and means for producing a substantially constant voltage over the full range of load on said load circuit comprising a circuit including a parallel connected reactor and capacitor arranged to be in resonance at no load connected in shunt relationship with said interphase system so as to cause said interphase system to be fully effective, and means for decreasing the impedance of the circuit connected in shunt with said interphase system with increasing load so as to gradually cause said interphase system to become ineffective.

2. In an electric valve converting apparatus, a supply circuit, a load circuit, an electric translating apparatus interconnecting said circuits and comprising a plurality of electric valve means and an interphase system, and means for producing a substantially constant voltage over the full range of load on said load circuit comprising a reactor arranged to be saturated with full load current connected in parallel with said interphase system, a tuning capacitor for producing at no load in conjunction with said reactor a parallel resonant circuit in shunt with said interphase system, and means for gradually saturating said reactor with increasing load current so as to vary the effectiveness of said interphase system inversely with increasing load.

3. In an electric valve converting apparatus, a supply circuit, a load circuit, an electric translating apparatus interconnecting said circuits and comprising a plurality of electric valve means and an interphase system, and means for regulating the voltage of said load circuit comprising a circuit including a parallel connected reactor and capacitor arranged to be in resonance at no load connected in shunt relationship with said interphase system so as to cause said interphase system to be fully effective, and means for decreasing the impedance of the circuit shunting said interphase system with increasing load so as to gradually cause said interphase system to become ineffective.

4. In an electric valve converting apparatus, a supply circuit, a load circuit, an electric translating apparatus interconnecting said circuits and comprising a plurality of electric valve means and an interphase system, and means for regulating the voltage of said load circuit comprising a reactor arranged to be saturated with full load current connected in parallel with said interphase system, a tuning capacitor for producing at no load in conjunction with said reactor a parallel resonant circuit in shunt with said interphase system, and means for gradually saturating said reactor with increasing load current so as to bypass current from said interphase system.

5. In an electric valve converting apparatus, a supply circuit, a load circuit, an electric translating apparatus interconnecting said circuits and comprising a plurality of electric valve means and an interphase transformer, means for regulating the voltage of said load circuit comprising a circuit including a parallel connected reactor and capacitor arranged to be in resonance at a predetermined load connected in shunt relationship with said interphase transformer, and means for varying the impedance of the circuit shunting said interphase transformer with increasing load so as to gradually vary the effectiveness of said interphase system.

FREDERICK O. STEBBINS.